(12) United States Patent
Kwok et al.

(10) Patent No.: US 7,557,884 B2
(45) Date of Patent: Jul. 7, 2009

(54) BISTABLE LIQUID CRYSTAL DEVICE

(75) Inventors: Hoi-Sing Kwok, Kowloon (CN); Xing Jie Yu, Kowloon (CN)

(73) Assignee: Hong Kong University of Science and Technology, Hong Kong (HK)

( * ) Notice: Subject to any disclaimer, the term of this patent is extended or adjusted under 35 U.S.C. 154(b) by 357 days.

(21) Appl. No.: 10/572,086

(22) PCT Filed: Oct. 18, 2004

(86) PCT No.: PCT/CN2004/001179

§ 371 (c)(1),
(2), (4) Date: Mar. 16, 2006

(87) PCT Pub. No.: WO2005/040899

PCT Pub. Date: May 6, 2005

(65) Prior Publication Data

US 2007/0024782 A1     Feb. 1, 2007

Related U.S. Application Data

(60) Provisional application No. 60/513,201, filed on Oct. 23, 2003.

(51) Int. Cl.
*G02F 1/1337* (2006.01)
*G02F 1/141* (2006.01)

(52) U.S. Cl. .................. 349/123; 349/124; 349/128; 349/136

(58) Field of Classification Search .................. None
See application file for complete search history.

(56) References Cited

U.S. PATENT DOCUMENTS 4,239,345 A * 12/1980 Berreman et al. ............ 349/179

(Continued)

FOREIGN PATENT DOCUMENTS

EP          1 042 702 B1       7/2003

(Continued)

OTHER PUBLICATIONS

G.D. Boyd, Julian Cheng, and P.D.T. Ngo, "Liquid-crystal Orientational bistability and nematic storage effects," Appl. Phys. Lett: 36(7):556-558, Apr. 1, 1980.
International Search Report for PCT/CN2004/001179, 2005.

*Primary Examiner*—Michelle R Connelly Cushwa
(74) *Attorney, Agent, or Firm*—Ostrolenk Faber LLP

(57) ABSTRACT

This invention provides a bistable liquid crystal device. The bistable liquid crystal device includes a first substrate having thereon a first conductive layer and a first alignment layer; a second substrate having thereon a second conductive layer and a second alignment layer; and a liquid crystal layer sandwiched between the first and second alignment layers. The first alignment layer induces a first pretilt angle $\theta 1$ in the range of 20°-65° between the liquid crystal layer in contact with the first alignment layer. The second alignment layer induces a second pretilt angle $\theta 2$ in the range of 20°-65° between the liquid crystal layer in contact with the second alignment layer. The liquid crystal layer is capable of maintaining a stable bend state or a stable splay state at zero bias voltage and is switchable between the stable bend state and the stable splay state when a switching energy is applied in operation to the liquid crystal layer.

17 Claims, 7 Drawing Sheets

U.S. PATENT DOCUMENTS

| | | | |
|---|---|---|---|
| 4,613,208 A * | 9/1986 | Boller et al. | 252/299.1 |
| 4,878,742 A * | 11/1989 | Ohkubo et al. | 349/201 |
| 5,583,680 A | 12/1996 | Nakamura et al. | 349/134 |
| 6,118,422 A * | 9/2000 | Hiroshima et al. | 345/94 |
| 6,222,605 B1 | 4/2001 | Tillin et al. | 349/167 |
| 2003/0063246 A1 * | 4/2003 | Bryan-Brown et al. | 349/123 |
| 2005/0062919 A1 * | 3/2005 | Bryan-Brown et al. | 349/123 |

FOREIGN PATENT DOCUMENTS

| | | |
|---|---|---|
| GB | 2 330 214 A | 4/1999 |
| WO | WO 03/102683 A1 * | 12/2003 |
| WO | WO 03/102683 A1 | 12/2003 |

* cited by examiner

BISTABLE LIQUID CRYSTAL DEVICE

CROSS REFERENCE TO RELATED APPLICATION

The present application is a 35 U.S.C. §§ 371 national phase conversion of PCT/CN2004/001179, filed Oct. 18, 2004, which claims priority of U.S. Application No. 60/513,201 filed Oct. 23, 2003.

FIELD OF INVENTION

The present invention is related to a liquid crystal device, and particularly to a bistable bend-splay liquid crystal device.

BACKGROUND OF INVENTION

Liquid crystal displays that are truly bistable under zero voltage bias are desirable for many practical applications. There are several types of bistable displays based on liquid crystals. They all have their advantages and drawbacks. For example, there is a large body of literature on the bistable cholesteric display where the bistable states are the focal conic and the planar alignment states. Another class of bistable liquid crystal display is based on ferroelectric type liquid crystals. Here the bistable states are both homogeneous alignment states with different orientations. The difference in orientations is determined by the angle of the dipole moment and the director of the liquid crystal molecules.

Yet another class of bistable liquid crystal display is based on the twisted nematic effect in a liquid crystal display. It relies on the interplay between the elasticity of the liquid crystal and the surface anchoring conditions. These are bistable twisted nematic displays where the bistable states are both twist states. In the Berreman bistable twisted nematic liquid crystal display, the bistable twist states are zero twist and 360° twist states (See, D. W. Berreman and W. R. Heffner: *J. Appl. Phys.* 52 (1981) 3032; and D. W. Berreman: *J. Opt. Soc. Am.* 63 (1973) 1374.). Kwok et al teaches a generalization of such bistable twisted nematic displays where the bistable twist states are $\phi$ and $\phi+2\pi$ twist states where $\phi$ can be several fixed values, both negative and positive (See, H. S. Kwok: *J. Appl. Phys.* 80 (1996) 3687, T. Z. Qian, Z. L. Xie, H. S. Kwok and P. Sheng: *Appl. Phys. Lett.* 71 (1997) 596, Z. L. Xie and H. S. Kwok: *Jpn. J. Appl. Phys.* 37 (1998) 2572, and Z. L. Xie and H. S. Kwok: *J. Appl. Phys.* 84 (1998) 77.). These $\phi$ values have be calculated and experimentally verified. These Berreman bistable twisted nematic displays can be called $2\pi$-BTN displays (See, D. W. Berreman and W. R. Heffner: *J. Appl. Phys.* 52 (1981) 3032; and D. W. Berreman: *J. Opt. Soc. Am.* 63 (1973) 1374.).

Durand et al teaches another variant of the bistable twisted nematic display where the bistable twist states are zero and 180° twist states (See, I. Dozov, M. Nobili and G. Durand: *Appl. Phys. Lett.* 70 (1997) 1179.). The switching of such display is more difficult, but not impossible, than the Berreman bistable liquid crystal displays. Again Kwok et al teaches a generalization of such $\pi$-BTN displays where the bistable twist states are $\phi$ and $\phi+\pi$ twist states, where $\phi$ can be one of several published values (See, H. S. Kwok: *J. Appl. Phys.* 80 (1996) 3687, T. Z. Qian, Z. L. Xie, H. S. Kwok and P. Sheng: *Appl. Phys. Lett.* 71 (1997) 596, Z. L. Xie and H. S. Kwok: *Jpn. J. Appl. Phys.* 37 (1998) 2572, and Z. L. Xie and H. S. Kwok: *J. Appl. Phys.* 84 (1998) 77.).

Yet there is another kind of bistable display, based on twisted nematic liquid crystals. It is an invention of Jones et al and is based on the bistable surface alignment conditions on an asymmetric grating surface (See, G. P. Bryan-Brown, C. V. Brown and J. C. Jones: Patent GB 9521106.6 (October 1995).). The liquid crystal molecules just outside the grating surface can be either homogeneously aligned or homeotropically aligned. This leads to a bistable alignment of the liquid crystal cell. This bistable display can be switched by the application of an electrical pulse to select either one of the surface conditions.

Further, Boyd et al (*Appl. Phys. Lett.* 36, 556 (1980)) presented a bistable display based on the bend-splay deformation. That display was also based on a guest-host effect with absorbing dyes and thick liquid crystal cells. The voltages needed for switching were very high and impractical.

It is therefore the object of the present invention to provide another bistable liquid crystal device.

SUMMARY OF INVENTION

In accordance with the objects of the present invention, there is provided in one aspect a bistable liquid crystal device having a first substrate having thereon a first conductive layer and a first alignment layer; a second substrate having thereon a second conductive layer and a second alignment layer; and a liquid crystal layer sandwiched between the first and second alignment layers. The first alignment layer induces a first pretilt angle $\theta_1$ in the range of 20°-65° between the liquid crystal layer in contact with the first alignment layer. The second alignment layer induces a second pretilt angle $\theta_2$ in the range of 20°-65° between the liquid crystal layer in contact with the second alignment layer. The liquid crystal layer is capable of maintaining a stable bend state or a stable splay state at zero bias voltage and is switchable between the stable bend state and the stable splay state when a switching energy is applied in operation to the liquid crystal layer.

In the preferred embodiment, the liquid crystal layer has a positive dielectric anisotropy and a cell gap-birefringence product 0.31±0.1 µm.

In another aspect of the present invention, there is provided a method for producing a bistable state in a bistable liquid crystal device. The bistable liquid crystal device includes a first substrate having thereon a first conductive layer and a first alignment layer, a second substrate having thereon a second conductive layer and a second alignment layer, and a liquid crystal layer sandwiched between the first and second alignment layers. The method comprises inducing a first pretilt angle $\theta_1$ in the range of 20°-65° between the liquid crystal layer in contact with the first alignment layer; inducing a second pretilt angle $\theta_2$ in the range of 20°-65° between the liquid crystal layer in contact with the second alignment layer; aligning the liquid crystal layer either in a stable bend state or in a stable splay state at zero bias voltage; and applying a switching energy to the liquid crystal layer to switch the liquid crystal layer between the stable bend state and the stable splay state.

The bistable bend-splay liquid crystal device according to the present invention has better viewing angles, better contrast ratios, faster selection and lower operating voltages than the other bistable displays based on the twisted nematic effect.

DETAILED DESCRIPTION

Figure 1:
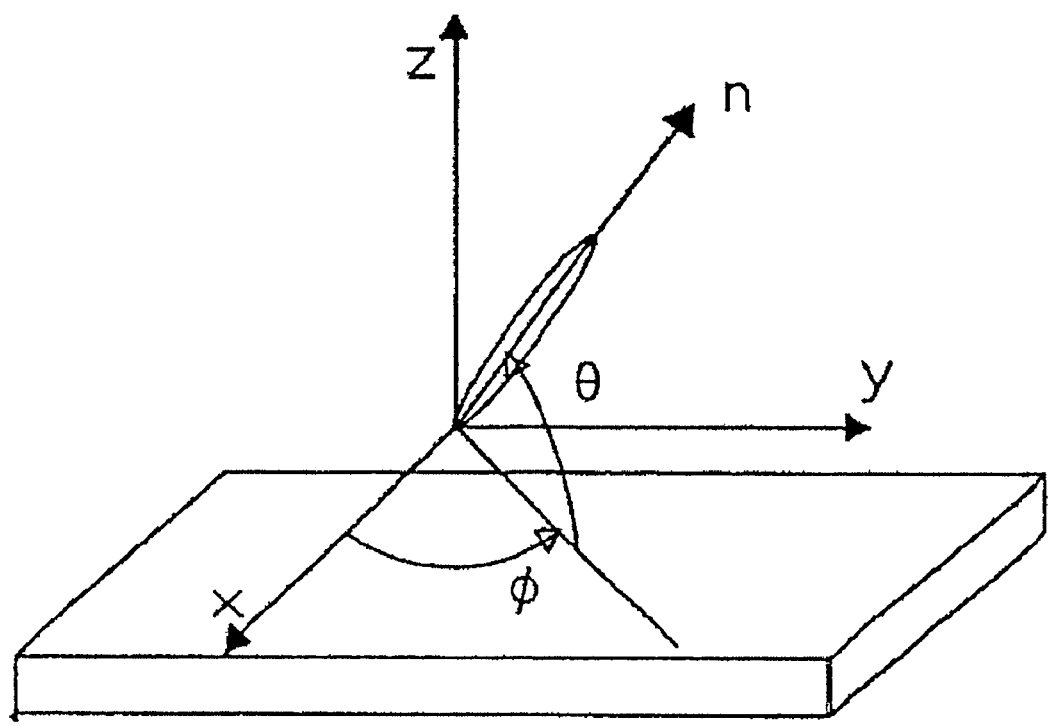
FIG. 1 is a schematic diagram showing the angles of the liquid crystal molecules relative to the alignment.

Referring to FIG. 1, the alignment of the liquid crystal molecules in a liquid crystal cell may be described by the director orientation n(z) in the one-dimensional approximation. The vector function n(z) is fully represented by the functions $\theta(z)$ and $\phi(z)$, where the $\theta(z)$ is the polar angle and $\phi(z)$ is the azimuthal angle of the vector n(z). The alignment of the liquid crystal is governed by minimization of the total elastic energy which leads to the usual Euler-Lagrange equations as given by formulas (1) and (2)

$$2k_1\ddot{\theta} + \frac{dk_1}{d\theta}\dot{\theta}^2 - \frac{dk_2}{d\theta}\dot{\phi}^2 - \frac{dk_3}{d\theta}\dot{\phi} - D^2\frac{d}{d\theta}\left(\frac{1}{\varepsilon_{zz}(\theta)}\right) = 0 \qquad (1)$$

$$2k_2\dot{\phi} + k_3 = \text{constant} \qquad (2)$$

where $k_1$ $k_2$ $k_3$ and $\epsilon_{zz}$ are given by $$k_1(\theta) = K_{11}\cos^2\theta + K_{33}\sin^2\theta \qquad (3)$$

$$k_2(\theta) = (K_{22}\cos^2\theta + K_{33}\sin^2\theta)\sin^2\theta \qquad (4)$$

$$k_3(\theta) = 2q_oK_{22}\cos^2\theta \qquad (5)$$

$$\epsilon_{zz}(\theta) = \epsilon_{//} - \Delta\epsilon\cos^2\theta(z) \qquad (6)$$

and D is the electric displacement. In equations (3) to (6), $K_{11}$ $K_{22}$ $K_{33}$ are, respectively, the splay, twist and bend elastic constants of the liquid crystal mixture, and $\epsilon_{//}$ and $\epsilon_\perp$ are the anisotropic dielectric constants and $\Delta\epsilon = \epsilon_{//} - \epsilon_\perp$ is the dielectric anisotropy. The equilibrium alignment configuration of the liquid crystal cell can be obtained by solving equations (1) and (2), subjected to the boundary conditions, which are determined by the surface treatment of the liquid crystal cell.

The solution of nonlinear coupled differential equations (1) and (2) is often not unique. There can be multiple solutions. Since the solutions are obtained by the minimization of the total elastic energy E, one has to calculate the elastic energy for the various stable configurations in order to find the solution with the absolute minimum energy. If the various stable solutions have nearly the same energy, multiple solutions will exist, which is the basis of bistability. Take the simplest case of a liquid crystal cell with a boundary conditions of $\phi(0) = \phi(d) = 0$; and $\theta(0) = \theta_1$ and $\theta(d) = -\theta_1$, where $\theta_1$ is a constant and d is the cell gap. If $K_{33}$ and $K_{11}$ are nearly the same, it can be shown that the following two solutions will both satisfy the boundary conditions and equation (1):

$$\theta(z) = \theta_1\left(1 - \frac{2z}{d}\right) \qquad (7)$$

and $$\theta(z) = \theta_1 + (\pi - 2\theta_1)\frac{z}{d} \qquad (8)$$

Figure 2A:
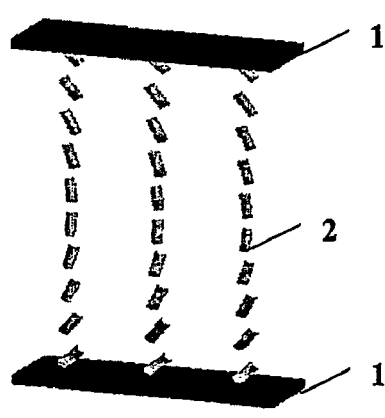
FIG. 2A is a perspective diagram illustrating how the liquid crystal is aligned in a typical bend state.
Figure 2B:
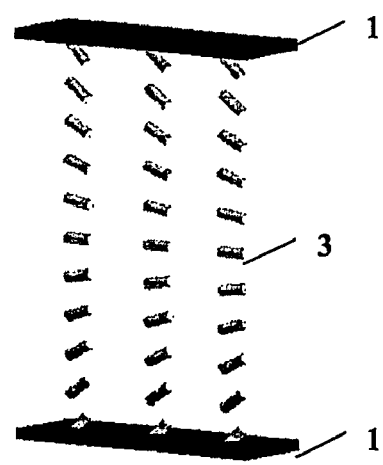
FIG. 2B is a perspective diagram illustrating how a liquid crystal is aligned in a typical splay state.

The reason is that the boundary conditions $\theta_1$ and $\pi - \theta_1$ are equivalent. Now equation (7) represents a splay cell and equation (8) represents a bend cell respectively, as shown in FIGS. 2A and 2B. In particular, under a bend state, liquid crystal molecules 2 will align themselves vertically at and near the mid-point between substrates 1 as shown in FIG. 2A, and under a splay state, liquid crystal molecules 3 will align themselves horizontally at and near the mid-point between the substrates 1 as shown in FIG. 2B.

Figure 3:
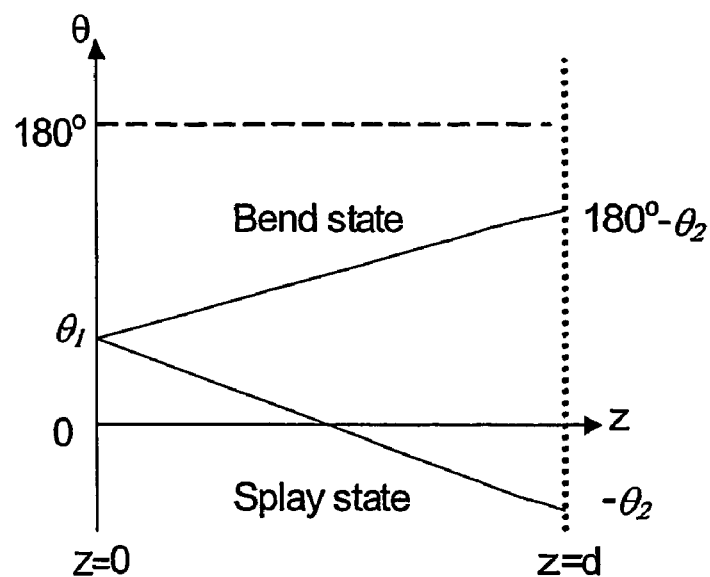
FIG. 3 is a schematic diagram showing the tilt angle of the liquid crystal as a function of position inside the cell.

The dependences of $\theta(z)$ for the two cases are also graphically shown in FIG. 3. Each of these two solutions represents a local minimum in the total elastic energy space.

It is possible to find out the condition where the two solutions are equally likely by equating the elastic energy of the splay and bend deformation cells. The total elastic energy per unit wall area is given by the equation $$E = \frac{1}{2}\int_0^d (K_{11}\sin^2\theta + K_{33}\cos^2\theta)\dot{\theta}^2 dz \qquad (9)$$

If the splay and bend cells have the same elastic energy, and if $K_{33}$ and $K_{11}$ are nearly the same, then the following equation can be derived:

$$(K_{33}-K_{11})\sin 2\theta_1 + (\pi - 4\theta_1)(K_{33}+K_{11}) = 0 \qquad (10)$$

By solving this equation, the condition for the pretilt angle such that the splay and bend deformation energies are the same can be obtained. For example, for p-methyoxybenzylidene-p'-butylaniline (MBBA), $K_{33}/K_{11} = 1.3$. Hence $\theta_1$ is about 47°. In general it can be shown that $\theta_1$ is always between 45° and 58° for all values of $K_{33}/K_{11}$. Under the condition that equation (10) is satisfied, bistability can be obtained. Actually bistability can be achieved even if the deformation energies for the bend and splay cells are slightly different.

There is actually another possible solution to equation (1). It is a π-twist cell. It can be proved that this π-twist state has a much higher total elastic energy than both bend and splay state and can be ignored.

Thus, given the proper boundary condition and pretilt angle, the stable alignment configuration of the liquid crystal cell can either be a splay or a bend cell. This is the basis of our invention. Our invention involves the design of such a bistable bend-splay display and methods of driving it. In the practical device, the pretilt angles on the liquid crystal cell surfaces can be different. Thus it is possible to have $\theta(0)=\theta_1$ and $\theta(d)=-\theta_2$. For the general case, the bend and splay elastic deformation energies are the same, and thus bistability can be achieved if the following condition is satisfied:

$$\frac{1}{2}(K_{33}-K_{11})\binom{\sin2\theta_1+}{\sin2\theta_2}+(K_{11}+K_{33})(\pi-2\theta_1-2\theta_2)=0 \quad (11)$$

This equation is a generalization of equation (10). An example of $\theta_1$ and $\theta_2$ that can satisfy this equation when $K_{33}/K_{11}=1.3$ is $\theta_1=30°$ and $\theta_2=65°$.

As well, there can be a small degree of twist in the stable alignment in order to improve the optical properties. Thus it is possible that $\phi(0)=0$ and $\phi(d)=\phi_o$ for some values of $\phi_o$.

Our invention is based on bistable bend and splay alignment of the liquid crystal cell. It can be called the bistable bend-splay liquid crystal display, or BBS display in abbreviation.

Figure 4:
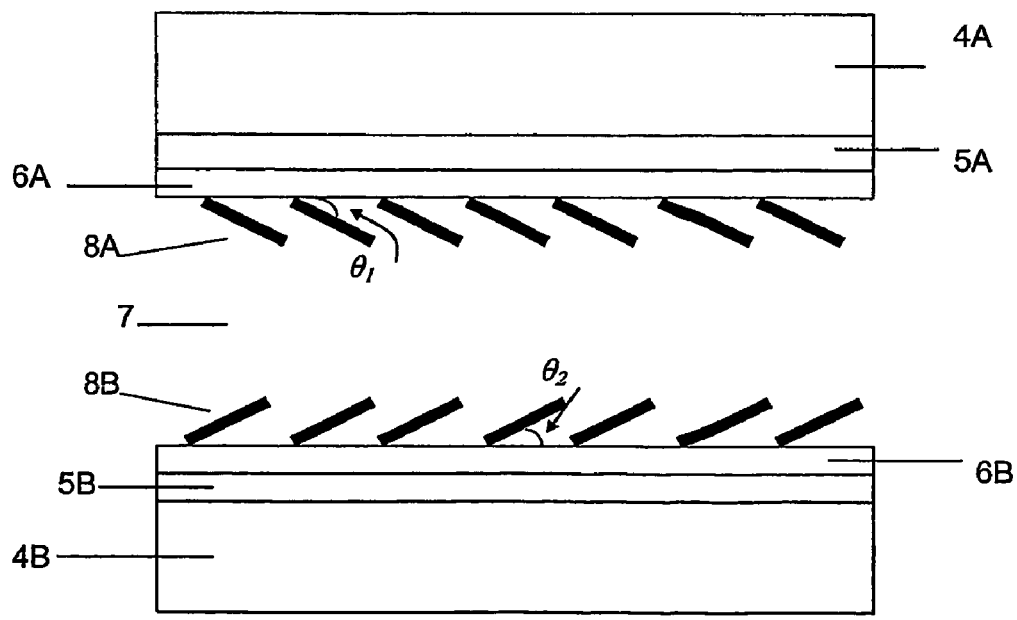
FIG. 4 is a cross-sectional view of a portion of a liquid crystal cell according to a preferred embodiment of the present invention.

Referring now to FIG. 4, the liquid crystal cell includes a first substrate 4A and a second substrate 4B, typically made from two pieces of glass. The inner surfaces of said first and second substrates 4A and 4B are respectively coated with conductive layers 5A and 5B, typically with transparent conductive layers of indium tin oxide (ITO). The ITO is then patterned to various shapes according to the display to be desired, which will be described in detail later. Typically, liquid crystal alignment layers 6A and 6B are respectively deposited onto said conductive layers 5A and 5B. In addition, a liquid crystal layer 7 is sandwiched between said first and second alignment layers 6A and 6B. Further, a pair of input and output polarizers (not shown) are positioned in parallel over said first and second substrates 4A and 4B. Typically, said pair of input and output polarizers respectively makes an angle of ±40° to ±60° with the liquid crystal alignment direction. Said first alignment layer 6A induces a first pretilt angle $\theta_1$ between said liquid crystal layer 7 in contact with said first alignment layer 6A, and said second alignment layer 6B induces a second pretilt angle $\theta_2$ between said liquid crystal layer 7 in contact with said second alignment layer 6B. In particular, the alignment layers 6A and 6B are treated such that the pretilt angle of liquid crystal molecules 8A near said first alignment layer 6A make an angle of $\theta_1$ to the surface of said first alignment layer 6A, and liquid crystal molecules 8B near said second alignment layer 6B make an angle of $\theta_2$ to the surface of said second alignment layer 6B respectively. The liquid crystal molecules in the middle of the liquid crystal cell will be at an angle that depends on the driving conditions. To maintain the bistable bend-splay states at zero bias voltage, large pretilt angles $\theta_1$ and $\theta_2$ are required. Typically, $\theta_1$ and $\theta_2$ in the range of 20°-65° are required. Said pretilt angles $\theta_1$ and $\theta_2$ can be the same value or substantially different.

The large pretilt angle that is required for bend-splay bistability can be obtained in one of several ways. The simplest way is to use photoalignment. It has been reported in the literature that photoalignment can be used to produce pretilt angles from 0 to 90° by adjusting the irradiation conditions. So it is possible to make the 40°-50° needed for $\theta_1$ and $\theta_2$. It is also possible to use normal rubbing of polyimide to make large pretilt angles. The special polyimide required is the so-called side-chain polymers.

Another method to make strong anchoring at large pretilt angles is by $SiO_x$ evaporation. We have experimental demonstration of the BBS display using $SiO_x$ evaporation, even though it is not the only way to do so. In our experimental demonstration, the glass plates with ITO electrodes are treated by oblique $SiO_x$ evaporation with evaporation angle of 85°, and thickness of 60~150 nm these being known to give the oblique anchoring of the liquid crystal molecules. Different thickness gives different anchoring energy. The pretilt angle of LC using is around 45° measured by the traditional crystal rotation method.

Figure 5:
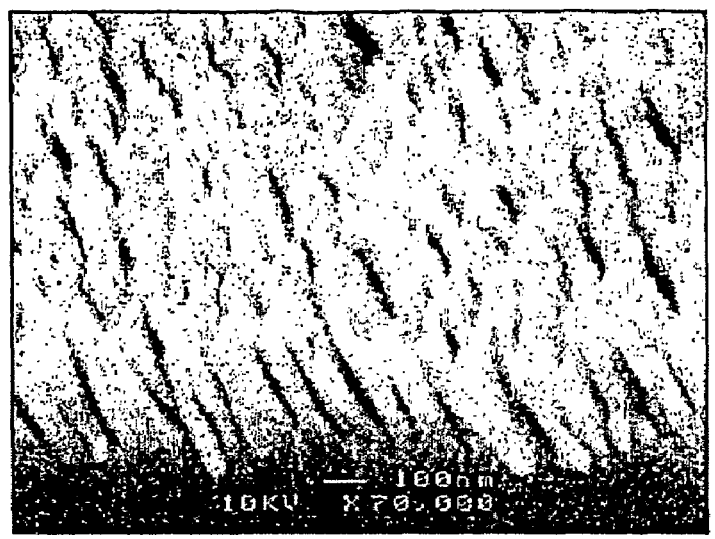
FIG. 5 is an SEM photograph of the surface of 150 nm $SiO_x$ layer deposited at an angle of 85°.

In the evaporation system the distance between source and sample should be larger so that the uniformity can be obtained over the entire region of the sample. FIG. 5 shows the scanning electron micrograph photograph of the surface of 150 nm $SiO_x$ layer deposited at an angle of 85°. This surface can produce the 45° pretilt of the liquid crystal molecules.

Yet another method of obtaining a high pre-tilt angle is by using a mixture of vertical and horizontal alignment material to produce the alignment layer. In particular, following are two examples for obtaining high pre-tilt angles.

EXAMPLE 1

Example 1 shows the procedures adopted to prepare an alignment layer capable of providing a pretilt angle of 44 degree.

Materials:
 The horizontal alignment material: purchased from Japan Synthetic Rubber Company (model number: JALS9203), which was in a solution form. (JSR Corporation, 5-6-10 Tsukiji Chuo-ku, Tokyo, 104-8410, Japan.) The solvent in JALS9203 comprises γ-butyrolactone (γBL), methyl-2-pyrrolidone (NW), and Butyl cellosolve (BC).
 The vertical alignment material: purchased from Japan Synthetic Rubber Company (model number: JALS2021), which was in a solution form. The solvent in JALS2021 comprises methyl-2-pyrrolidone (NWP) and Butyl cellosolve (BC).
 Substrate: an ITO glass coated with electrodes, purchased from Nanbo Company, Shenzhen, China.

Procedures:
 0.95 g of horizontal alignment material solution and 0.05 g of the vertical alignment material solution were mixed together and stirred thoroughly. The mixture was applied to the substrate to obtain a soft solid film using spin coating. The spin coating was first operated at 800 rmp for 10 sec and then at 3500 rmp for 100 sec. A soft film consisting of the horizontal and vertical alignment materials was formed with remnant solvents.

In order to drive out all the remnant solvents and to cure the polymers, the coated glass was placed in an oven. It was first baked at 100° C. for 10 min (soft bake) and then baked at 230° C. for 90 min (hard bake). A hard film, i.e., the alignment layer, was formed.

The surface of the alignment layer was subjected to rubbing treatment using a nylon cloth in such a way that the layer was rubbed in one direction one time.

Result:
 The pretilt angle of the alignment layer produced accordingly to Example 1 was 44 degree.

EXAMPLE 2

Example 2 shows the procedures adopted to prepare an alignment layer capable of providing a pretilt angle of 53 degree.

Materials:

The horizontal alignment material: purchased from Japan Synthetic Rubber Company (model number: JALS9203), which was in a solution form.

The vertical alignment material: purchased from Japan Synthetic Rubber Company (model number: JALS2021), which was in a solution form.

Substrate: an ITO glass coated with electrodes, purchased from Nanbo Company, Shenzhen, China.

Procedures:

0.5 g of the solution of horizontal alignment material and 0.5 g of the solution of the vertical alignment material were mixed together and stirred thoroughly. The mixture was applied to the substrate to obtain a soft solid film using print coating as follows:

A stainless steel rod of 2 cm diameter and 5 inches long was placed on the substrate. A few drops of the mixture were placed underneath the rod until it spread out along the contact line between the rod and the surface of the substrate. The rod was then rolled or slided along the substrate surface to form a liquid film.

The coated substrate was then placed on a hot plate at 100° C. for 10 min to drive out all the solvents. It was then put in an oven for hard baking at 230° C. for 90 min. A hard film consisting of vertical and horizontal alignment materials was then obtained. The spin coating was first operated at 800 rmp for 10 sec and then at 3500 rmp for 100 sec. A soft film consisting of the horizontal and vertical alignment materials was formed with remnant solvents.

In order to drive out all the remnant solvents and to cure the polymers, the coated substrate was placed in an oven. It was first baked at 100° C. for 10 min (soft bake) and then baked at 230° C. for 90 min (hard bake), forming a hard film, i.e., the alignment layer. The surface of the alignment layer was subjected to rubbing treatment using a nylon cloth in such a way that the layer was rubbed in one direction one time.

Result:

The pretilt angle of the alignment layer produced accordingly to Example 2 was 53 degree.

In example 1, the liquid film becomes a soft solid film by spin coating. The solvent is evaporated slowly so that the domains of H and V tend to be larger. Also the ratio of surface areas of H and V domains will favor the material that has a higher solubility in the mixed solvent since the material with a lower solubility will precipitate first.

In example 2, the solidification is fast due to heating on a hot plate. Thus the domains tend to be smaller. The area ratio of the H and V domains will not be affected too much by the different solubility of the materials.

The pretilt angles obtained by the procedures in example 1 and example 2 are different, even for the same mixture of H and V alignment agents. This is because of the different domain structures obtained using the different procedures.

Figure 6:
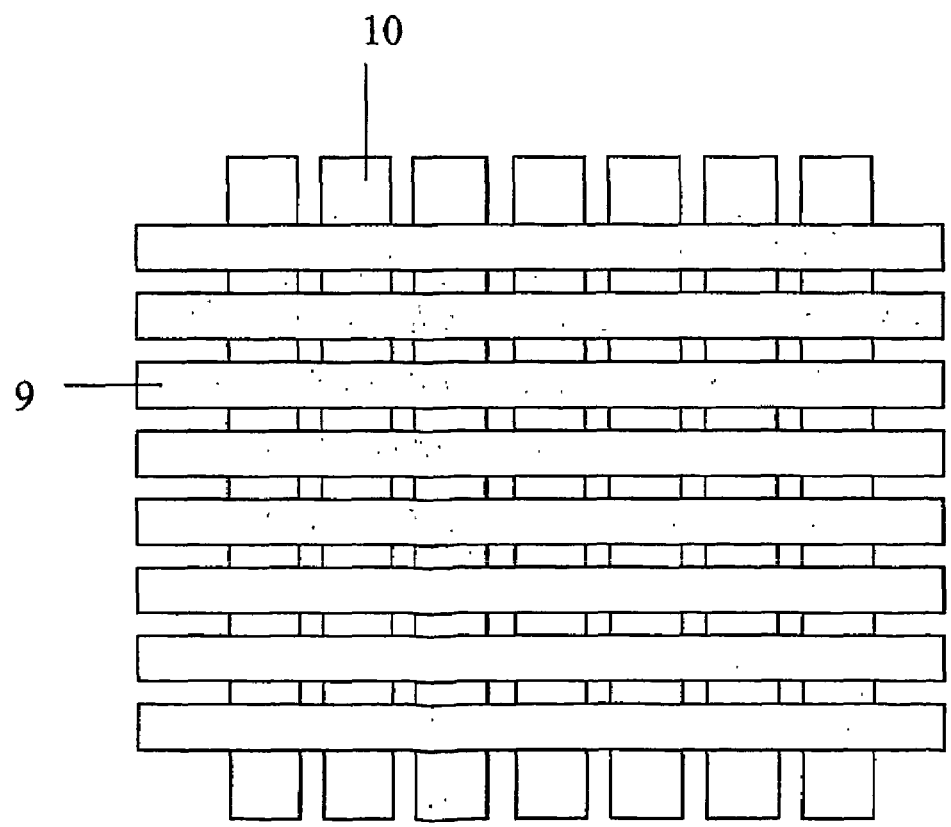
FIG. 6 is a perspective diagram illustrating a preferred embodiment of the structure of a passive matrix display.

When a switching energy is applied in operation to the liquid crystal layer 7, the liquid crystal therein can be switched between the stable bend state and the stable splay state. Typically, the switching energy is an electrical pulse generated by the first and second conductive layers 5A and 5B. In one embodiment, the first and second conductive layers 5A and 5B are patterned into stripes that are substantially perpendicular in direction to each other to form an overlapping matrix of pixels. In particular, for a matrix display, the ITO is patterned into horizontal and vertical stripes 9 and 10 with small gap between the stripes. The intersection area between the top and bottom electrodes respectively of the first and second conductive layers 5A and 5B forms the pixel area as shown in FIG. 6. In another embodiment, both the first and second conductive layers 5A and 5B are transparent. Voltages are applied to the top and bottom electrodes to switch the liquid crystal cell to either the bend state or the splay state of alignment. For example, the electrical pulse having low frequency can align the liquid crystal layer 7 to the bend state, and the electrical pulse having high frequency can align the liquid crystal layer 7 to the splay state. Alternately, a dual frequency driving method can be used to drive the BBS with the help of a dielectric anisotropy that changes sign as the driving frequency is changed. For the bend state, we need a positive $\Delta\in$ so that when a voltage is applied between the top and bottom electrodes, the mid-plane liquid crystal molecules will align themselves vertically, thus favoring the bend alignment. As the driving frequency is change so that $\Delta\in$ is negative, then the mid-plane molecules will favor a horizontal alignment. Thus a splay deformation is obtained.

Now both the splay and bend states are so-called birefringence modes for a liquid crystal display. The transmission of these states is given by the equation $$T = \cos^2(\alpha-\gamma) - \sin 2\alpha \sin 2\gamma \sin^2 \delta \qquad (12)$$

where $\alpha$ and $\gamma$ are the polarizer and analyzer angles; $\delta$ is the phase retardation of LC cell which is given by $$\delta = \frac{\pi}{\lambda} \int_0^d (n_e(\theta) - n_o) dz \qquad (13)$$

where $n_e(\theta)$ is the extraordinary refractive index, $n_o$ is the ordinary refractive index of the liquid crystal material, and d is the thickness of the liquid crystal cell. As usual $\Delta n = n_e - n_o$ is the birefringence of the liquid crystal material. $\alpha$, $\gamma$ and $d\Delta n$ can be optimized to obtain the best optical properties. Our goal is to achieve the highest contrast ratio (CR) which is the brightness of the on-state divided by the residual brightness of the dark state, and less dispersion for bright state. The optimization shows that $\alpha=-\gamma=45°$, and $d\Delta n=0.30\sim0.32$ μm. Since the display mode is the same as the normal birefringence mode liquid crystal display, therefore odd multiples of this value 0.30~0.32 μm can also be used to make the liquid crystal display, at the expense of higher color dispersion. Thus it is possible to have $d\Delta n=0.93$ μm, 1.55 μm as well.

Generally, for common LC materials, large $n_e-n_o$ results in larger $\Delta\in$ which implies a faster response. But larger $n_e-n_o$ means that the cell gap should be smaller for a fixed $d\Delta n$. The cell gap cannot be too small due to manufacturing yield. We have made three kinds of LC cells. The details are shown in Table 1. In particular, the LC materials in Table 1 can be obtained from Merck Company. All of them showed the bend-splay bistabilities. The 3.25 μm cell gap case is interesting because it has a large $\Delta\in$ and an appropriate cell gap. But it should be stressed that any cell gap can be used in our bistable bend-splay display.

TABLE 1

| | LC mode selection | | |
|---|---|---|---|
| d (μm) | LC materials | $n_e - n_o$ | $\Delta\epsilon$ |
| 1.5 | 5CB or 5700-100 | 0.15~0.18 | 25.8 |
| 3.25 | 5700-000 or 7500-000 | 0.1~0.12 | 23.6 or 10.2 |
| 5 | 88Y1104 | 0.07 | 10.4 |

Figure 7:
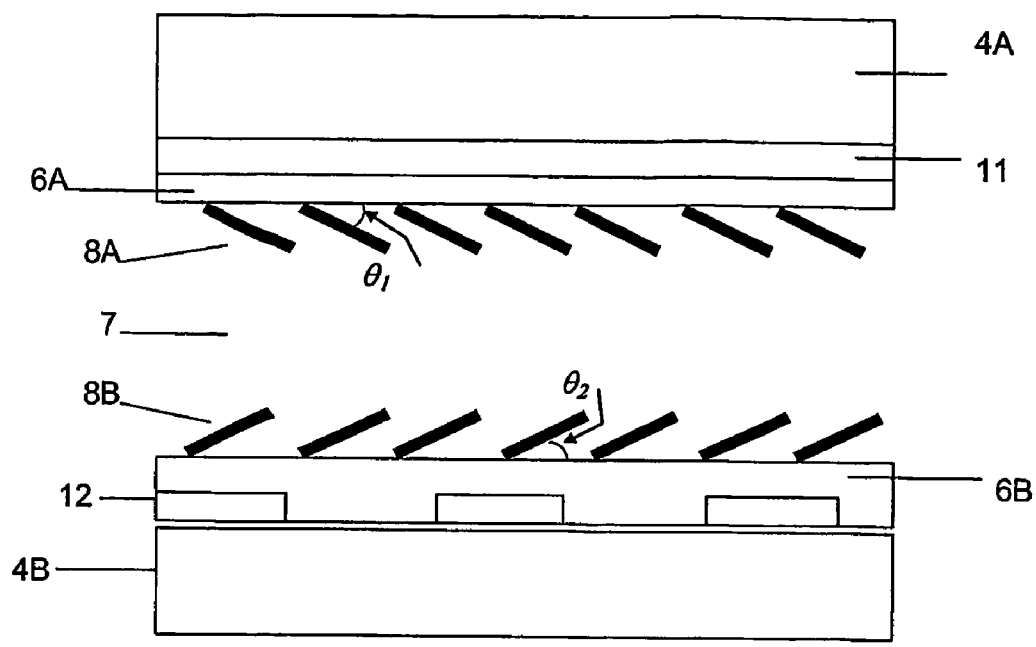
FIG. 7 is cross-sectional view of a portion of a liquid crystal cell having patterned electrodes according to another preferred embodiment of the present invention.
Figure 8:
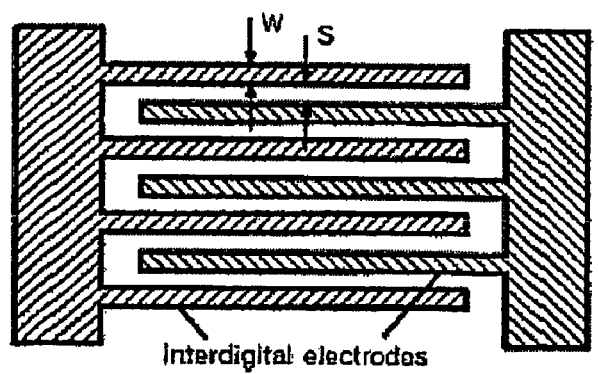
FIG. 8 is a perspective diagram illustrating an interdigital structure of conductive layer electrodes.

In a second preferred embodiment of the BBS, the driving of the cell from the bend configuration to the splay configuration is achieved through a horizontal electric field. The basic cell structure of this BBS is shown in FIG. 7. It is essentially the same as FIG. 4 except that ITO electrodes 11 and 12 of the first and second conductive layers 5A and 5B are now patterned. In particular, the bottom electrode 12 has an interdigital structure as shown in FIG. 8. In the experimental demonstration, the interdigital electrodes are 4 µm wide and spaced 6 µm apart, resulting in a pitch of 10 µm. Other dimensions are possible.

Figure 9:
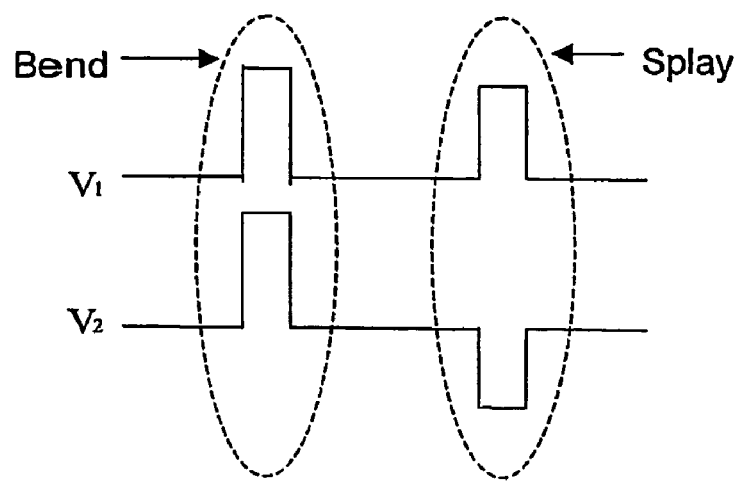
FIG. 9 is a schematic diagram showing driving waveform of the electrical pulses to the interdigital electrodes.

For this preferred embodiment, the driving method is shown in FIG. 9. The top electrode 11 is biased at a common voltage $V_c$. Electrical pulses are applied to the interdigital electrodes 11 and 12. The opposing digits are given voltages of $V_1$ and $V_2$ respectively. This is different from the common in-plane switching method of liquid crystal displays in which the top electrode is floated. But this comparison is irrelevant to our invention anyway. The important point here is that we can control the voltages on the interdigital electrodes 11 and 12 such that either a vertical or horizontal electric field is imposed upon the liquid crystal molecules.

In the simplest case, $V_c$ is kept constant at ground. Two electrical pulse trains $V_1$ and $V_2$ are applied to the bottom electrodes. When $V_1$ and $V_2$ are the same, either positive or negative, the electric field inside the liquid crystal cell is in the vertical direction. The liquid crystal alignment will favor the bend state. When $V_1$ is opposite in sign to $V_2$, the electric field inside the liquid crystal cell is horizontal (in-plane). Thus the splay state is obtained. The efficiency of switching is dependent of the spacing of interdigital electrodes, the liquid crystal cell gap and the amplitude and duration of the electrical $V_1$ and $V_2$ pulses.

Figure 10:
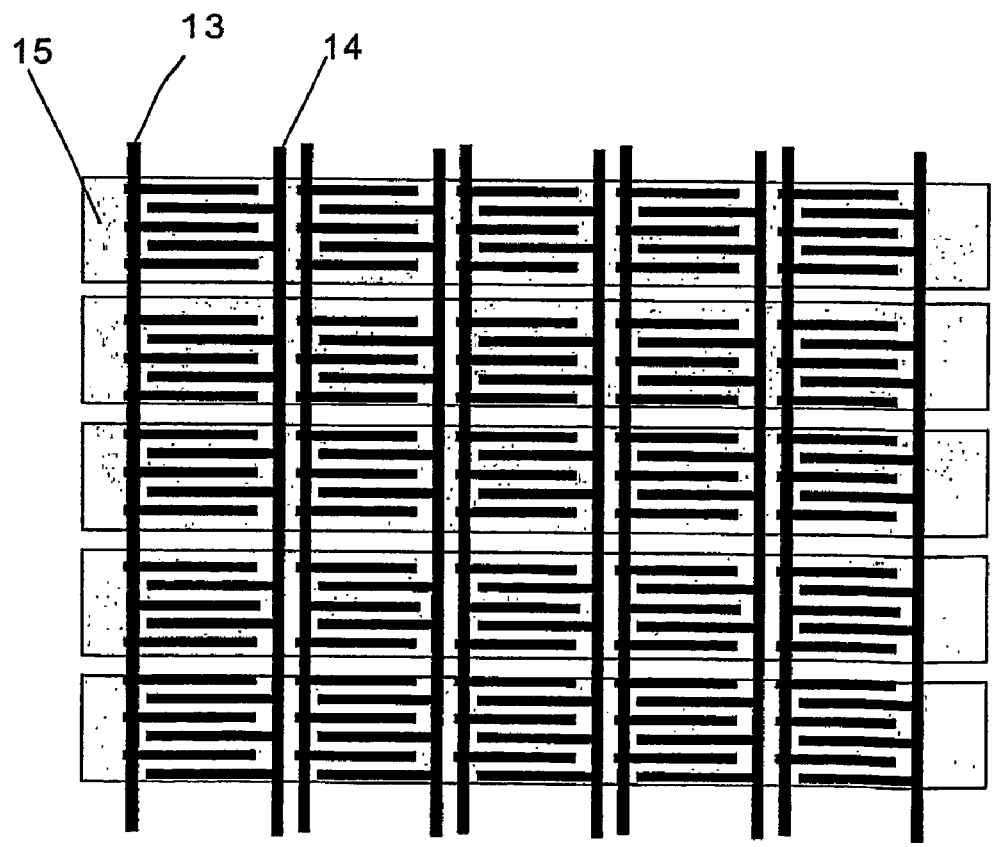
FIG. 10 is a perspective diagram illustrating a structure of the passive matrix display with interdigital electrodes.

The interdigital electrode is amenable to a matrix arrangement for making a passive matrix display. The arrangement of the top and bottom electrodes is depicted in FIG. 10. The common top electrodes are used as scan electrodes while data is fed to the interdigital lines. In this case, $V_c$ also participates in the driving scheme. Thus it is possible to multiplex the driving scheme to make a high-resolution display with no cross talk.

Figure 11:
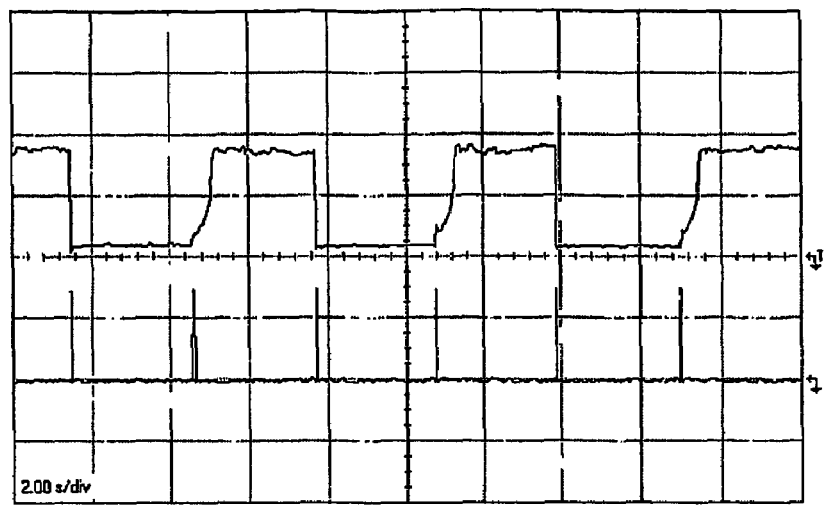
FIG. 11 is experimental demonstration results showing transmission of the cell as a function of the electrical pulses.

In order to test the effectiveness of this preferred embodiment, we fabricated three kinds of liquid crystal cells as shown in Table 1. All of these cells can show BBS bistability and can be switched. Here we cite the results of the 3.25 µm cell as an example. In this example, the glass plates with ITO electrodes are treated by oblique $SiO_x$ evaporation with evaporation angle of 85°, and thickness of 150 nm. Under this condition, the pretilt angle was 45°. The rectangular pulses of voltage U and duration τ are applied. The experimental results are shown in FIG. 11. Here, U=27V and τ=1 ms. We used the same voltage for both bend state and the splay state. However, the voltages needed for the bend state can be different from that of the splay state. For circuitry considerations in a matrix-driving scheme, having the same voltage is a little more convenient to control.

Figure 12:
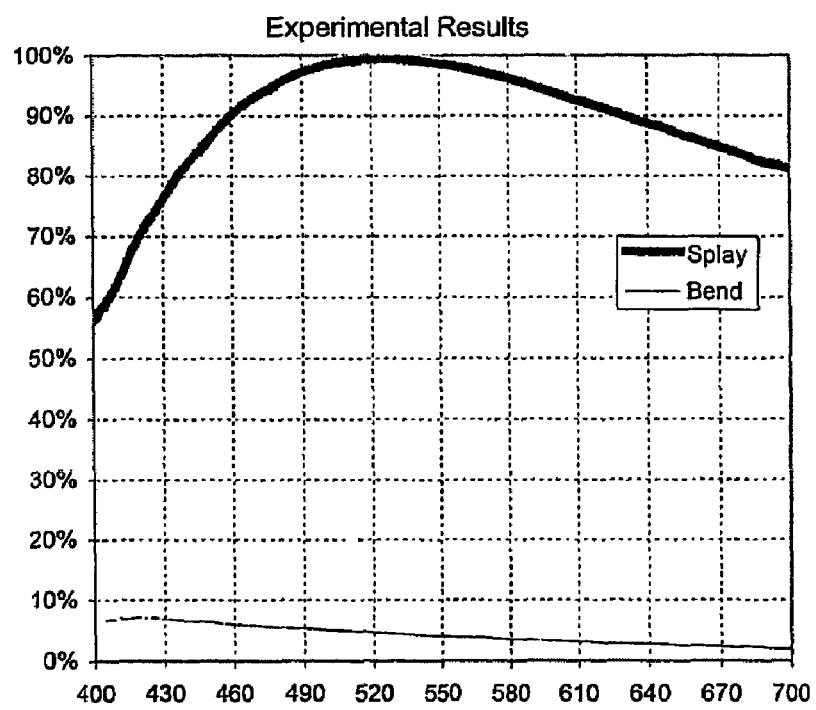
FIG. 12 is a diagram showing experimentally measured transmission spectra of the BBS display.

FIG. 12 shows the transmission spectra of the splay and the bend states. It can be seen that the wavelength dispersion for this display is quite small. The dark state is quite dark, giving an experimentally measured CR of 45. It is possible to improve the contrast and the light transmission efficiency by adding a half-wave plate between the polarizers. From theoretical simulations, CR of over 200 can be achieved with white light illumination.

Figure 13:
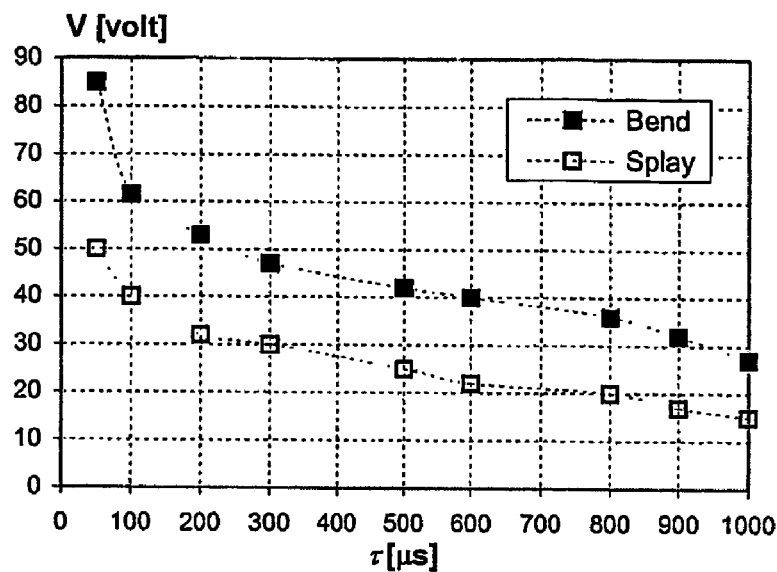
FIG. 13 is a diagram showing driving voltages needed as a function of the duration of the driving pulses.
Figure 14:
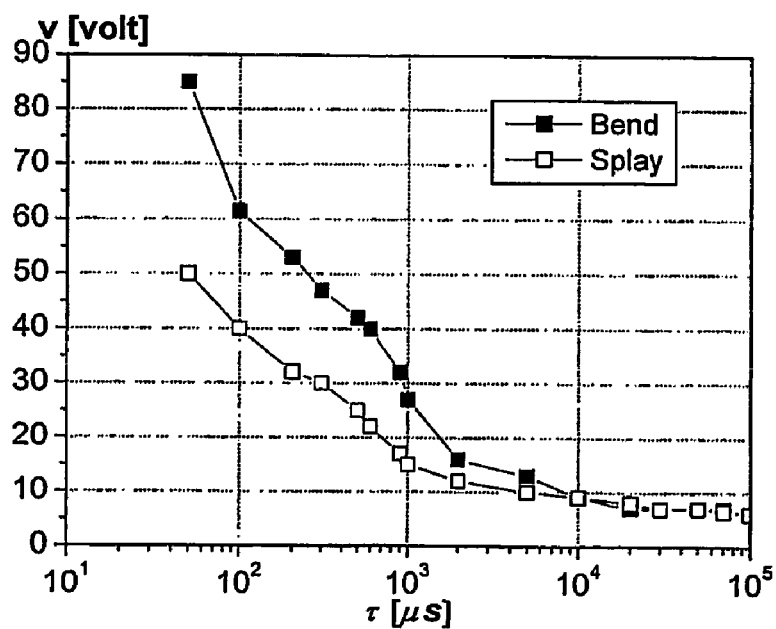
FIG. 14 is a diagram showing driving voltages needed as a function of the duration of the driving pulses.

Generally, the switching voltage is related to the duration of the switching pulse. For a short pulse, a higher voltage is required. All experimental data obtained in this preferred embodiment were obtained using $SiO_x$ evaporation with a 45° pretilt angle. The method to obtain the high pre-tilt angle alignment here is conventional. For example, T. Uchida et al teach such method (see, T. Uchida, M. Ohgawara and M. Wada: Japn. J. Appl. Phys. 19, 2127 (1980)). FIGS. 13 and 14 show our experimental data. Here we varied the duration of the driving pulses $V_1$ and $V_2$, and measure the voltage needed for switching. It can be seen that the smallest duration that can achieve bend-splay switching is 50 µs. However, over 85V is needed. For a 1 ms pulse, the voltage needed is 28V. From FIG. 12, it can be seen that the voltage needed for switching for this 3.25 µm cell is less than 10V for a 10 ms pulse. This is well suited for a matrix display using conventional driver electronics.

In a third preferred embodiment of the present invention (not shown in figures), the liquid crystal cell is designed as a one-polarizer reflective display. In particular, one of the interdigital electrodes or the common electrodes is optically reflecting. The configuration of this liquid crystal cell is the same as the transmittive display, except that here, either the interdigital electrodes or the common electrode is now made of a reflective metal. The polarizer on the side of the metallic electrode also can be eliminated since it will now serve no function. As in the previous cases, the LCD cell with a high pre-tilt layer was achieved by $SiO_x$ evaporation.

The reflectivity of this liquid crystal display is given by $$T = 1 - \sin^2 2\alpha \sin^2 2\delta \qquad (14)$$

Again, optimal optical performance is possible for α=45°. However, for the reflective display, since light traverses the liquid crystal cell twice, the birefringence cell gap product dΔn should be half of that of the transmittive case. For this reflective cell, the LC modes are listed in Table 2.

TABLE 2

| | LC mode selection | | |
|---|---|---|---|
| d (µm) | LC materials | $n_e - n_o$ | Δε |
| 0.8 | 5CB or 5700-100 | 0.15~0.18 | 25.8 |
| 1.63 | 5700-000 or 7500-000 | 0.1~0.12 | 23.6 or 10.2 |
| 2.5 | 88Y1104 | 0.07 | 10.4 |

Other values are possible, with the help of a retardation film to compensate for better optical properties. Also, for the sake of manufacturing and mass production, a larger cell gap may be needed at the expense of compromised optical performance.

In a further embodiment of the present invention, the bistable display can be driven in a passive matrix mode. With the finger electrodes $V_1$ and $V_2$, and the common voltage $V_c$ properly designed, a passive matrix display can be designed with no crosstalk, regardless of the multiplex number. This is a major advantage over non-bistable displays where there is crosstalk associated with multiplexing. An example of the values of $V_1$, $V_2$, and $V_c$ can be shown in Table 3 for the case of 1 ms pulses.

TABLE 3

| Switching behavior of a passive matrix bistable display | | | |
|---|---|---|---|
| $V_1$ (volt) | $V_2$ (volt) | $V_c$ (volt) | Final state |
| 15 | −15 | 0 | Splay |
| 28 | 28 | 0 | Bend |
| 15 | −15 | 15 | No change |
| 28 | 28 | 15 | No change |

The common rows are used as the addressing electrodes. Select voltage is 0 and nonselect voltage is 15V. The data lines are $V_1$ and $V_2$. Here a combination of $V_1$ and $V_2$ gives the data signal. A combination of 15V and −15V gives the splay state while a combination of 28V and 28V gives the bend state. All of these switching behaviors have been verified experimentally.

All the voltages can be offset by a constant voltage without affecting the behavior of the display. For example, 15V can be subtracted from all the voltages to make the select voltage −15V and the nonselect voltage 0 for the scan lines as follows:

TABLE 4

Switching behavior of a passive matrix bistable display

| $V_1$ (volt) | $V_2$ (volt) | $V_c$ (volt) | Final state |
|---|---|---|---|
| 0 | −30 | −15 | Splay |
| 13 | 13 | −15 | Bend |
| 0 | −30 | 0 | No change |
| 13 | 13 | 0 | No change |

Other voltages are possible as long as switching can be achieved without crosstalk. For example, for the case of a 10 ms pulse, the following combinations should provide proper multiplexing of the passive matrix display:

TABLE 5

Switching behavior of a passive matrix bistable display

| $V_1$ (volt) | $V_2$ (volt) | $V_c$ (volt) | Final state |
|---|---|---|---|
| 10 | −10 | 0 | Splay |
| 10 | 10 | 0 | Bend |
| 10 | −10 | 10 | No change |
| 10 | 10 | 10 | No change |

If we subtract 10V from all the electrodes, there will be no change in the behavior of the display, and the following table can be obtained:

TABLE 6

Switching behavior of a passive matrix bistable display

| $V_1$ (volt) | $V_2$ (volt) | $V_c$ (volt) | Final state |
|---|---|---|---|
| 0 | −20 | −10 | Splay |
| 0 | 0 | −10 | Bend |
| 0 | −20 | 0 | No change |
| 0 | 0 | 0 | No change |

This represents a very simple driving scheme, as $V_1$ is kept constant at all times. $V_2$ is switched in a manner similar to ordinary multiplexing of STN liquid crystal displays. Thus one can use commercial STN LCD drivers to drive this bistable display.

The present invention has been described in detail herein in accordance with certain preferred embodiments thereof. To fully and clearly describe the details of the invention, certain descriptive names were given to the various components. It should be understood by those skilled in the art that these descriptive terms were given as a way of easily identifying the components in the description, and do not necessarily limit the invention to the particular description. For example, the substrates are typically made from glass, but may be made of any material that can interact properly with the alignment layer, the electrodes and the liquid crystal cell. Further, a few methods of obtaining the high pre-tilt angle are provided, but the present invention is not limited to the provided methods. The present invention is applicable as long as the high pre-tilt angle can be achieved. Therefore, many such modifications are possible. Accordingly, it is intended by the appended claims to cover all such modifications and changes as falling within the true spirit and scope of the present invention.

What is claimed is:

1. A bistable liquid crystal device comprising:
 a first substrate having thereon a first conductive layer and a first alignment layer;
 a second substrate having thereon a second conductive layer and a second alignment layer; and
 a liquid crystal layer sandwiched between said first and second alignment layers, said first alignment layer inducing a first pretilt angle $\theta_1$ in the range of 20°-65° between said liquid crystal layer in contact with said first alignment layer, and said second alignment layer inducing a second pretilt angle $\theta_2$ in the range of 20°-65° between said liquid crystal layer in contact with said second alignment layer, said liquid crystal layer being capable of maintaining a stable bend state or a stable splay state at zero bias voltage and being switchable between said stable bend state and said stable splay state when a switching energy is applied in operation to said liquid crystal layer; and
 at least one of said first and second alignment layers includes a mixture of vertical alignment material and horizontal alignment material.

2. The device of claim 1 wherein said liquid crystal layer comprises liquid crystal having a positive dielectric birefringence when driven by electrical pulses at low frequency and a negative birefringence when driven by electrical pulses at high frequency.

3. The device of claim 1 further comprising input and output polarizers.

4. The device of claim 3 wherein said input and output polarizers respectively angle said alignment direction by ±40° to ±60°.

5. The device of claim 1 wherein said pretilt angles on said pair of substrates are substantially different.

6. The device of claim 1 wherein said pair of substrates have substantially parallel alignment directions.

7. The device of claim 1 wherein said switching energy is an electrical pulse generated by said first and second conductive layers.

8. The device of claim 1 wherein said switching energy is an electrical pulse having low frequency to align said liquid crystal layer to said bend state.

9. The device of claim 1 wherein said switching energy is an electrical pulse having high frequency to align said liquid crystal layer to said splay state.

10. The device of claim 1 wherein said switching energy is an electrical pulse providing an electrical field in a predetermined direction between said pair of substrates to switch said liquid crystal layer between said bend state and said splay state.

11. The device of claim 1 wherein one of said conductive layers further includes a patterned electrode to provide an electrical field in a predetermined direction between said pair of substrates to switch said liquid crystal layer between said bend state and said splay state.

12. The device of claim 1 wherein one of said conductive layers further includes a patterned electrode, said patterned electrode having an interdigital structure so that controlling the voltages on said interdigital electrode can apply either a vertical or horizontal electric field upon said liquid crystal layer.

13. The device of claim 1 wherein said first and second conductive layers are patterned into stripes that are substantially perpendicular in direction to each other to form an overlapping matrix of pixels.

14. The device of claim 1 wherein both said first and second conductive layers are transparent.

15. The device of claim 1 wherein one of said first and second conductive layer is optically reflecting.

16. A bistable liquid crystal device comprising:
a first substrate having thereon a first conductive layer and a first alignment layer;
a second substrate having thereon a second conductive layer and a second alignment layer; and
a liquid crystal layer sandwiched between said first and second alignment layers, said liquid crystal layer having a positive dielectric anisotropy under a low frequency electrical field and a negative dielectric anisotropy under a high frequency electrical field, said first alignment layer inducing a first pretilt angle $\theta_1$ in the range of 20°-65° between said liquid crystal layer in contact with said first alignment layer, and said second alignment layer inducing a second pretilt angle $\theta_2$ in the range of 20°-65° between said liquid crystal layer in contact with said second alignment layer, said liquid crystal layer
being either in a stable bend state or in a stable splay state at zero bias voltage;
being switchable between said stable bend state and said stable splay state when a switching energy is applied in operation to said liquid crystal layer, and at least one of said first and second alignment layers includes a mixture of vertical alignment material and horizontal alignment material.

17. A bistable liquid crystal device comprising:
a first substrate having thereon a first conductive layer and a first alignment layer;
a second substrate having thereon a second conductive layer and a second alignment layer; and
a liquid crystal layer sandwiched between said first and second alignment layers, said liquid crystal layer having a positive dielectric anisotropy and a cell gap-birefringence product of 0.31±0.1 µm, said first alignment layer inducing a first pretilt angle $\theta_1$ in the range of 20°-65° between said liquid crystal layer in contact with said first alignment layer, and said second alignment layer inducing a second pretilt angle $\theta_2$ in the range of 20°-65° between said liquid crystal layer in contact with said second alignment layer, said liquid crystal layer
being either in a stable bend state or in a stable splay state at zero bias voltage;
being switchable between said stable bend state and said stable splay state when a switching energy is applied in operation to said liquid crystal layer, and at least one of said first and second alignment layers includes a mixture of vertical alignment material and horizontal alignment material.

* * * * *